United States Patent

Allen

[15] 3,677,427
[45] July 18, 1972

[54] STABILIZING STRUT FOR TRACKED LOADER

[72] Inventor: Thomas E. Allen, Mustangtea, Okla.
[73] Assignee: Caterpillar Tractor Co., Peoria, Ill.
[22] Filed: April 23, 1971
[21] Appl. No.: 136,868

[52] U.S. Cl. .................................214/140, 180/9.52
[51] Int. Cl. .................................................B66f 9/00
[58] Field of Search .................298/17 S; 180/9.52, 9.5; 214/140, 142, 143, 776

[56] References Cited

UNITED STATES PATENTS 3,083,059  3/1963  Biszantz.................................298/17 S
3,375,944  4/1968  Bexten...................................214/140

Primary Examiner—Gerald M. Forlenza
Assistant Examiner—John Mannix
Attorney—Fryer, Tjensvold, Feix, Phillips & Lempio

[57] ABSTRACT

A hydraulic strut secured between the tractor frame and each front track roller frame of a loader that serves as a tipping mode stabilizer under conditions of high bucket load, or as a damper of roller frame oscillation under low or no load conditions. The strut may be arranged to apply a stabilizing force tending to prevent roller frame pivotable movement as a function of pressure in the head end of the loader arm lift cylinder when the pressure is high, while permitting controllably dampened, relatively free movement of the track roller assembly for maximum ground contact and smooth flotation over irregular ground conditions when the head end pressure is low. The strut may be further arranged such that it is rendered inoperative or insensitive to high pressures at the head end of the lift cylinder when the roller frame idler is located clockwise from its normal level state in order that the normal mobility of the loader is not detrimented.

11 Claims, 3 Drawing Figures

INVENTOR
THOMAS E. ALLEN 3,677,427

STABILIZING STRUT FOR TRACKED LOADER

BACKGROUND OF THE INVENTION

A four-track loader such as disclosed in U.S. Pat. No. 3,435,908 requires a larger bucket than its wheeled counterpart in order to make unit loading costs competitive with the wheeled unit. The larger bucket and its load requires some additional means of obtaining equivalent longitudinal stability to the wheeled counterpart. The usual method is to provide rear counterweights or heavier components in the rear track systems than are required by imposed loading.

Carrying such added weight decreases machine response and detracts from the unit cost picture. Accordingly, advantages are to be gained by the provision of a device, other than counterweights or heavy rear track systems, that would allow a larger bucket to be used without sacrificing longitudinal tipping stability.

Heretofore, various attempts have been made to provide longitudinal tipping stability without resort to substantial additional machine weight. In this regard, various self-leveling struts have been devised for applying stabilizing force to the track roller frames of a track laying vehicle under excessive tip load conditions. However, aside from the relative complexity of such previous strut arrangements, they have suffered from various disadvantages when applied to a tracked bucket loader.

Although tipping stability may be provided under conditions of high bucket load, previous strut arrangements have not been well suited to removal of the stabilizing force as soon as the bucket is dumped whereby the track frames are immediately free to oscillate in the traveling mode of operation. In addition, provision has generally not been made to deactivate the load function of previous struts when the idler of a track roller frame is lowered. Without this function, it is relatively difficult to get out of a mud-hole, or the like, since the stabilizing force tends to continuously urge the idler end of the frame into the hole.

SUMMARY OF THE INVENTION

The present invention relates to an improved stabilizing strut for a tracked loader, and is particularly directed to a hydraulic strut secured between the tractor frame and each front track roller frame and which serves the purpose of a tipping mode stabilizer by tending to prevent roller frame pivotal movement in response to high bucket loads, and yet permits controllably damped relatively free pivotal movement of each track roller frame in the traveling mode of vehicle operation.

As a further important feature, the strut may be made sensitive to clockwise departures of a track roller frame idler from a level horizontal position to responsively disable the load function of the strut, thereby preserving the mobility of the vehicle under such non-level conditions.

In the accomplishment of the foregoing and other advantages and features, a stabilizing strut in accordance with the present invention generally includes a cylindrical housing with an extendable rod and piston mounted for reciprocal movement therein. The head end of the housing is pivotally secured to the tractor frame and the piston rod is pivotally end connected to one of the front end track roller frames at a position forward of the pivot point of the roller frame, i.e., on the idler side thereof. A similar strut is associated with the other front end track roller frame.

The head and rod end chambers of each strut housing are coupled in parallel communication with the head and rod end chambers of the bucket lift cylinder, preferably through the intermediary of primary valve arranged to communicate the respective cylinders only when the head end lift cylinder pressure exceeds a predetermined value corresponding to a heavy load in the bucket. The valve is preferably arranged to establish restricted fluid flow between the opposite ends of the strut cylinder when the valve is in its inactive state corresponding to relatively low pressure in the head end of the lift cylinder. As a result, the strut applies a reaction force to the track roller frame to counteract the tipping force of the bucket load.

When the load is dumped, the restricted flow through the valve between the opposite ends of the strut cylinder provides a limited damping action which permits relatively free oscillation of the track roller frame while tending to lower peak roller loads due to slapping action of the roller frame after the vehicle has gone "over-center" of a bump. The velocity of impact is also lowered.

The strut arrangement may further include a level-sensing secondary valve for rendering the strut inoperative or insensitive to high pressures in the head end of the lift cylinder when the track roller frame idler is located clockwise from its normal level state. Consequently, when the idler is lowered, no stabilizing force is applied which would tend to maintain the track roller frame in a forwardly downwardly tilted position. In such a position, the tipping point is effectively moved forward from the track roller frame pivot to the ground resting point of the idler, and tipping stability is thereby achieved without requirement of a stabilizing force.

DETAILED DESCRIPTION OF THE INVENTION

Figure 1:
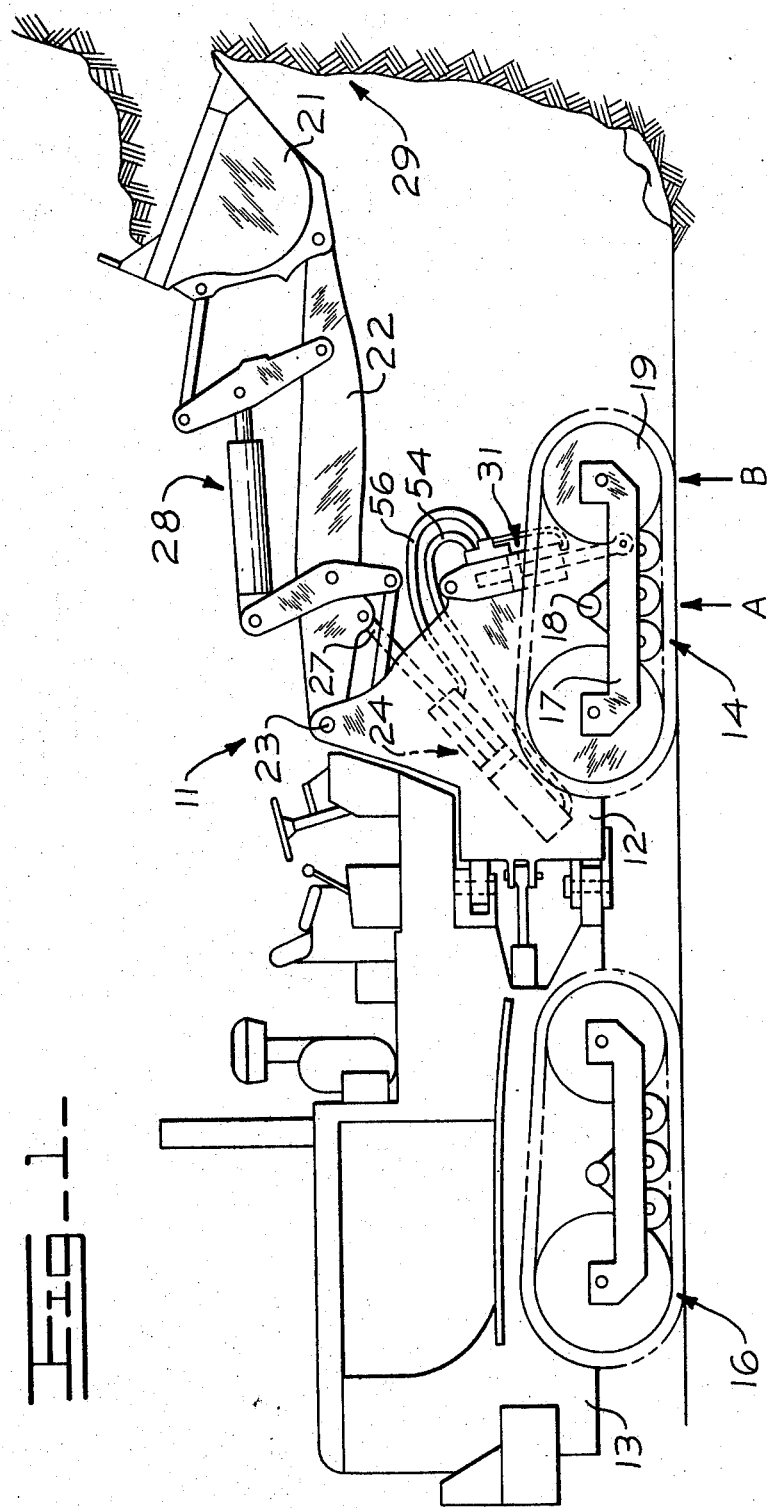
FIG. 1 is a side elevational view of an articulated bucket loader embodying a stabilizing strut in accordance with the present invention.

Referring now to FIG. 1 in detail, there is shown an articulated loader 11 including front and rear sections 12 and 13, respectively, having a pair of endless track assemblies 14 and 16 carried at the opposite sides thereof. Each front track assembly 14 includes a track roller frame 17 which is centrally pivotable about an axle member 18 secured to front section 12 and has an idler 19 at its forward end.

A loader bucket 21 is carried at the forward end of a pair of parallel lift arms 22 which are pivotal at 23 with respect to front section 12. To raise the lift arms, a pair of hydraulic lift cylinders 24 are trunnion mounted to the frame of front section 12 and the piston rods 27 of the lift cylinders are pivotally end secured to the lift arms.

In addition, tilt linkage 28 is carried by the lift arms and is coupled to the bucket to control inclination thereof with respect to the arms. As the head end of each lift cylinder is pressurized while the rod end thereof is opened to drain, the lift arms 22 are raised and the bucket 21 is manipulated by the tilt linkage 28 to obtain a load from a stockpile 29, or the like, in a conventional manner.

It will be appreciated that inasmuch as the front track assemblies 14 are pivotable about axle member 18, a pivot point A forms a fulcrum as the bucket is raised through heavy loads, and high pressures are directed to the head end of the lift cylinders 24. These loads are sometimes so high that the rear end of the loader vehicle 11 is raised, or tipped from the ground.

Heretofore, this instability has generally necessitated the addition of heavy counterweights to the rear of the vehicle to increase the loads imposed on the cutting edge of the bucket while maintaining stability of the vehicle. This added weight decreases machine or vehicle response and detracts from the unit cost picture.

In order to obviate the foregoing difficulties, increased longitudinal tipping stability of the loader 11 is accomplished without the use of counterweights or other weighty structure by means of hydraulic stabilizing struts 31 in accordance with the present invention which are secured between the frame of loader front section 12 and each front track assembly 14 to apply a stabilizing reaction force thereto under conditions of high bucket loads.

Figure 2:
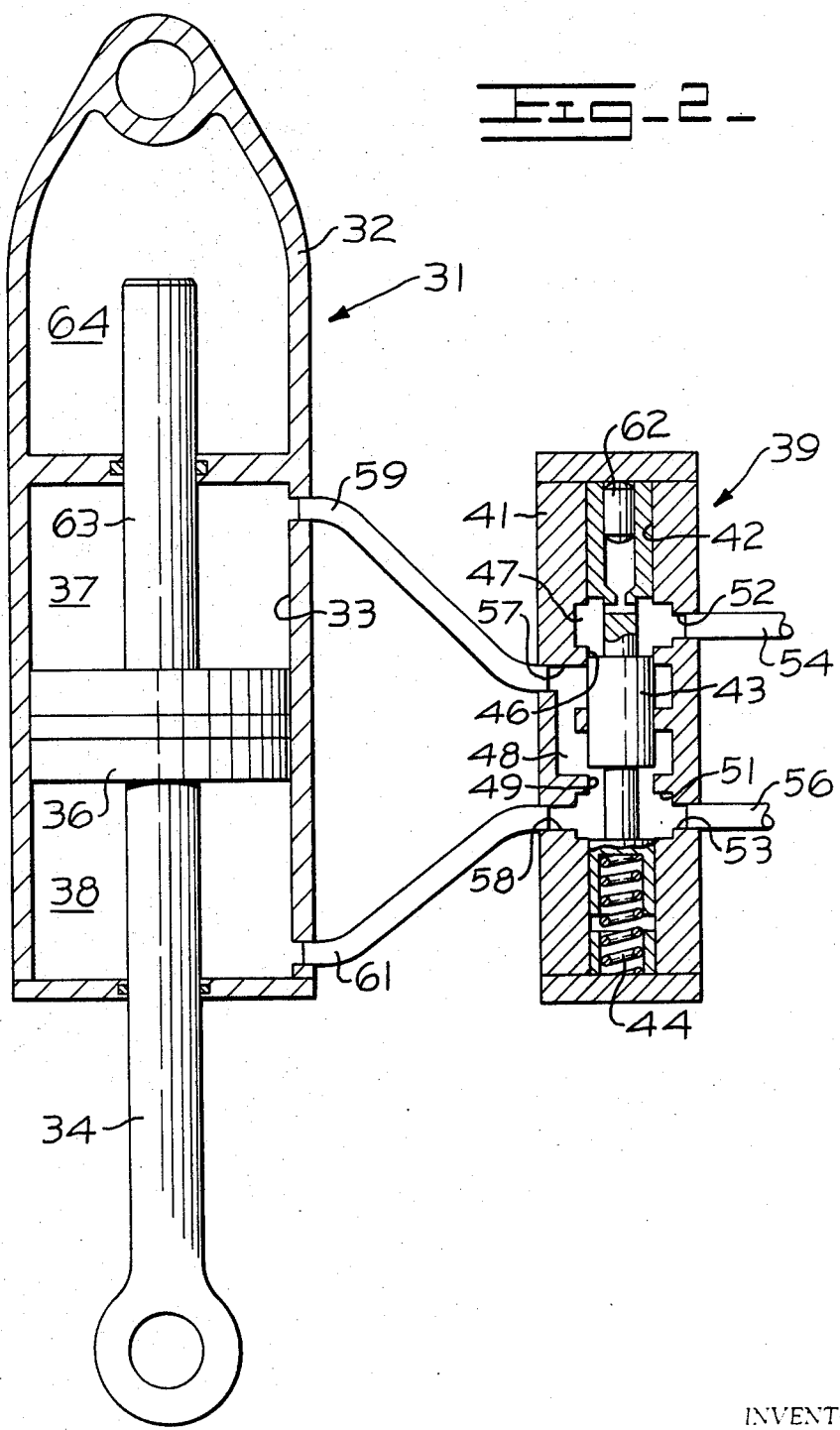
FIG. 2 is a side sectional view of the stabilizing strut in association with a primary control valve for enabling actuation of the strut to generate a tipping stabilizing force only when the bucket load exceeds a predetermined value, while otherwise providing a controlled damping action by the strut to track roller frame oscillation.
Figure 3:
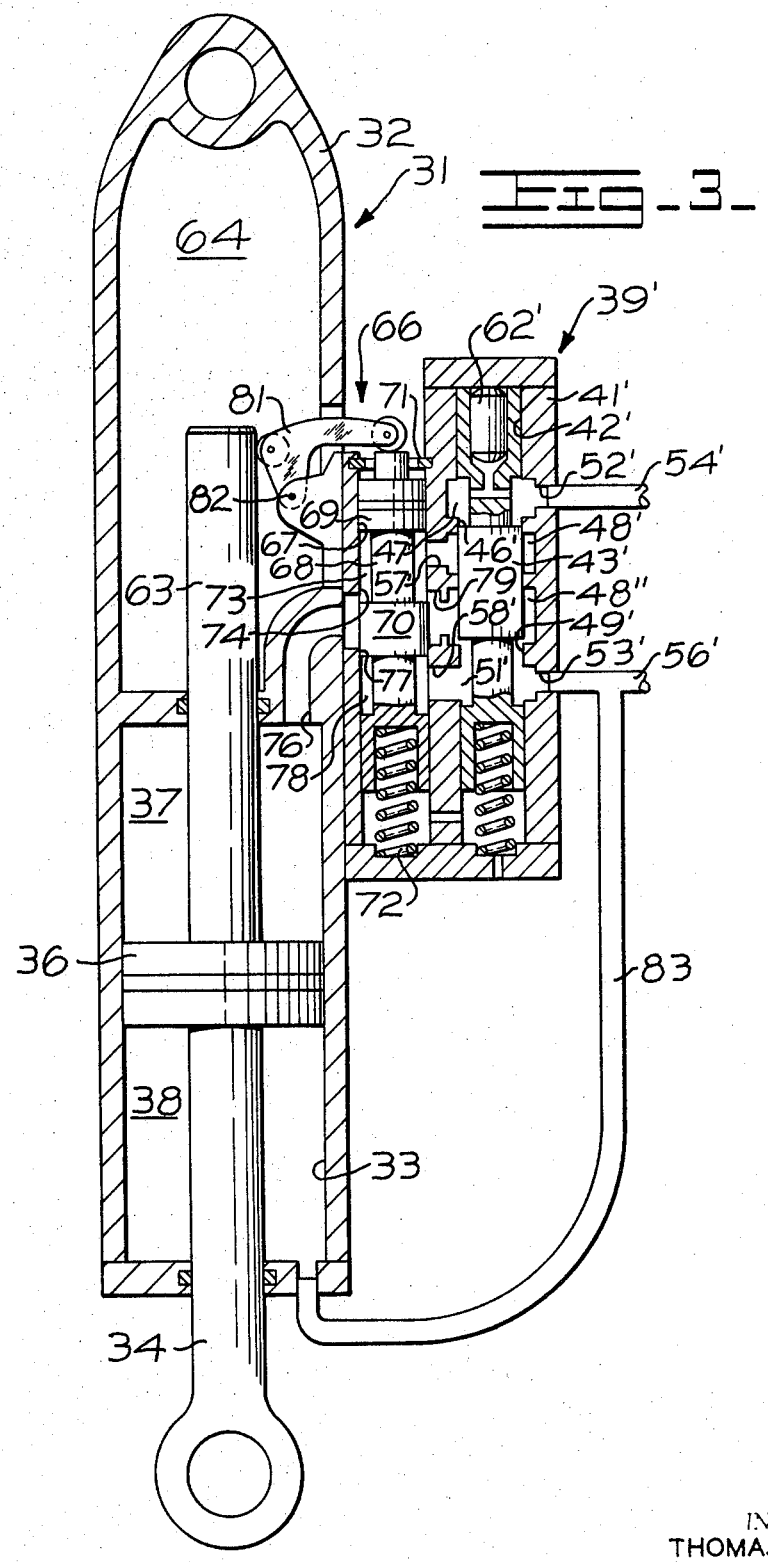
FIG. 3 is a view similar to FIG. 2 of a modified form of valve means which includes a level-sensing secondary valve for disabling the load function of the strut when the track roller frame has a lowered idler.

Each stabilizing strut 31 includes a cylindrical housing 32 defining a bore 33, and an extendible rod 34 and piston 36 mounted for reciprocal movement in the bore, as shown in FIGS. 2 and 3. The head end of each housing 32 is pivotally connected to the frame of front section 12, and the rod 34 is pivotally connected to the track roller frame 17 of one of the front track assemblies 14 at a position forwardly displaced from the pivot axle 18, i.e., on the idler end of the tip pivot point A. Thus, when the head end of the housing 32 is pressurized while the rod end thereof is ported to drain, the rod 34 exerts a reaction force on the track roller frame 17 which tends to oppose tipping force due to heavy bucket loads and stabilizes the loader vehicle 11 against tipping.

In order that the strut 31 exerts stabilizing force only when the bucket is relatively heavily loaded, while permitting relatively free oscillation of the track roller frame 17 about pivot axle 18 under low or no load conditions, it is necessary that means be provided to sense the load condition of the bucket 21 and correspondingly actuate the struts 31. In this regard, the pressure in the head end of each lift cylinder 24 is advantageously employed as a load sensing signal.

More particularly, the head and rod end chambers 37 and 38 within strut housing 32 on opposite sides of the piston 36 may be communicably connected in parallel with the head and rod ends of the lift cylinder 24. In this manner, the struts continuously generate a stabilizing force in direct proportion to the lift cylinder head end pressure, and thus the bucket load.

However, it is desirable that the struts be energized only when the bucket load exceeds a predetermined value, while providing a controlled damper action to the front track roller frames when the load value is not exceeded. Accordingly, each strut is preferably paralleled with the lift cylinder through the intermediary of a primary valve 39, as shown in FIG. 2, which is arranged to provide the foregoing functions.

Considering now the primary valve 39 in detail, it is to be noted that same includes a valve housing 41 having a cylindrical bore 42 therein, a relief spool 43 being mounted for reciprocation within the bore and biased upwardly to an inactive position by means of a spring 44 acting between the base of the bore and the spool.

In the inactive position, the spool engages an annular seat 46 formed within the bore 42 to block communication between an end chamber 47 within the valve housing and a central chamber 48. At this time, the spool is also slightly displaced from a second annular seat 49 formed within the bore, the spool and seat defining a restricted throttling opening communicating the central chamber 48 with a second end chamber 51.

Ports 52 and 53, respectively, communicating with the first and second end chambers 47 and 51 are respectively connected, as by means of lines 54 and 56, to the head and rod ends of lift cylinder 24. Ports 57 and 58 communicating with central chamber 48 and second end chamber 51 are respectively connected, as by means of lines 59 and 61 to the head and rod end chambers 37 and 38 of strut housing 31.

The spool 43 is provided with a reaction slug 62 which is communicated with end chamber 47 such that the bias force of spring 44 is opposed by head end lift cylinder pressure applied to such chamber via line 54 acting upon the area of the slug.

With the valve 39 thus provided, it will be appreciated that the inactive position of spool 43 may be set for a predetermined head end lift cylinder pressure of, for example, 1,000 psi in accordance with the bias force of spring 44. Any increase in head end pressure beyond the predetermined value acting in chamber 47 then effects displacement of spool 43 against the spring bias force to an actuated position wherein the spool is displaced from seat 46 and engaged with seat 49.

In the actuated position communication is thus established between chambers 47 and 48, while communication is blocked between chambers 48 and 51. In other words, the head and rod ends of lift cylinder 24 are respectively communicated with the head and rod end chambers 37 and 38 of strut housing 32 through the valve 39.

The head end lift cylinder pressure is consequently applied in strut chamber 37 to the piston 36 to generate a stabilizing force upon the rod 34 given by the pressure multiplied by the area of the piston minus the area of a plunger 63 projecting coaxially from piston 36 through chamber 37 into an overlying bell casing 64. The plunger is provided in order that the chambers 37 and 38 have equal displacement volumes upon movement of the piston. If the head end pressure in chamber 37 is, for example, 2,000 psi, the stabilizing force that is generated may be easily of the order of 35,000 pounds per strut.

If the lever arm distance between the pivot axle 18 of the track roller frame 17 and the connecting point of strut rod 34 is of the order of 15 inches, the net reaction moment about axle 18 for both struts is of the order of 1,050,000 pound-inches. This moment is equivalent to a rear, bumper-mounted counterweight of 5,025 pounds, assuming a lever arm distance of 200 inches between pivot axle 18 and the rear end of the loader 11.

It is to be noted that the strut piston 36 does not normally move or travel very significantly from its centered position in housing 32 with the loader on level ground, but simply provides the reaction force.

Considering now the operation of the stabilizing strut 31 when the head end pressure of lift cylinder 24 is less than the predetermined value, it is to be noted that the spool 43 is at this time in its inactive position wherein communication between chambers 47 and 48 is blocked and communication between chambers 48 and 51 is established through the throttling opening 49.

With relatively low pressure in the head end of the lift cylinder, the rod end thereof is typically blocked by the bucket lift control valve spools (not shown) resulting in line 56 being blocked. Thus, under these conditions any fluid pressure in one of the strut chambers 37 or 38 in excess of the other, causes flow of fluid across the throttling opening 49 to the other chamber. The resulting throttling action provides controlled damping of track roller frame oscillation since equal volumes of fluid are displaced between the chambers 37 and 38 with either extension or retraction of the rod 34.

It will be appreciated that under some conditions it is desirable that the reaction force generating function of the strut 31 be disabled under conditions of heavy bucket load. More particularly, if the idler 19 is lowered clockwise from its normal level state, as occurs, for example, when same is in a mudhole, it becomes somewhat more difficult to maneuver the loader 11 out of the hole if the reaction force is applied since the force tends to urge the idler into the hole.

In order to overcome this difficulty, the stabilizing strut arrangement may be modified in the manner depicted in FIG. 3. As shown therein, the strut arrangement includes both a primary valve 39', generally similar to that of FIG. 2, and a secondary level-sensing valve 66. Primed reference numerals refer to components and portions of valve 39' which are similar to valve 39.

The secondary valve 66 includes a cylindrical bore 67 defined within a valve housing which is advantageously an extension of primary valve housing 41'. A valve member 68 including longitudinally spaced spools 69 and 70 is mounted for reciprocation within bore 67 and is normally biased upwardly to a closed position against stops 71 by means of a spring 72 acting between the base of the bore and the valve member.

A first chamber 73 defined within the bore between spools 69 and 70 is communicated with port 57' of the primary valve 39'. In the closed position of the valve, spool 70 engages an annular seat 74 defined within bore 67 to block communication between chamber 73 and a passage 76 extending from the bore to the head end chamber 37 of the strut 31.

At the same time, the spool 70 is displaced from a second annular seat 77 defined within the bore to establish communication between the passage 76 and a second chamber 78. Chamber 78 is communicated with chamber 51' of primary valve 39' via port 58'.

At this point, it is to be noted that the primary valve 39' includes two non-communicating central chambers 48' and 48" rather than the single central chamber 48 of the valve 39 of the embodiment of FIG. 2. The chamber 48' is communicated with chamber 47' through valve seat 46' and communicates with port 57'.

Chamber 48" communicates with chamber 51' through valve seat 49' and is provided with a port 79 opening to the bore 67 at a position intermediate the secondary valve seats 74 and 77.

In the closed position of the secondary valve, the port 79 communicates with chamber 78 via seat 77 and is blocked from chamber 73 by spool 70 engaging seat 74.

The secondary valve 66 is actuatable to an open position upon depression of valve member 68 downwardly against the loading of spring 72. In such open position, communication is established between chamber 73 and passage 76 via valve seat 74 while communication between chamber 78 and passage 76 is blocked by spool 70 engaging seat 77. At the same time port 79 is communicated with chamber 73 via seat 74.

To accomplish actuation of the secondary valve to open position, a bellcrank 81 is pivotally mounted within strut bell casing 64, as indicated at 82, for abutment by the plunger 63 when the piston 36 is in a substantially centered position between the head and rod end chambers 37 and 38 with the strut housing 32. Abutment by the plunger moves the crank clockwise about pivot 82 to in turn urge the secondary valve member 68 downwardly to its open position. Thus, the secondary valve is in its open position when the track roller frame 17 is in a level position or the idler end thereof is pivoted upwardly.

However, when the idler end of the frame is pivoted downwardly from a level position, the strut rod 34 is extended from the strut housing 32 and plunger 63 is out of abutment with the bellcrank 81, whereby the secondary valve is in its closed position.

In the operation of the level sensing strut arrangement of FIG. 3, it is to be noted that when lift pressures are below the predetermined design value set by primary valve 39' to correspond to conditions of empty and light bucket loading, the strut acts only as a damper in a manner similar to that hereinbefore described with reference to the embodiment of FIG. 2. With the track roller frame 17 level and secondary valve 66 thereby open while primary valve 39' is closed due to the relatively low head end lift cylinder pressure, head end strut chamber 37 is communicated with rod end chamber 38 via passage 76, secondary valve chamber 73, port 79, primary valve chamber 48", throttling opening 49', primary valve chamber 51', port 53', and a line 83 connecting the port to rod end chamber 38. Thus, equal volumes of fluid are displaced between the chambers 37 and 38 with either extension or retraction of rod 34, and controlled damping is effected by the displaced fluid passing through throttling opening 49'.

When the head end lift pressure increases beyond the predetermined design value, primary valve 39' is operated to its actuated position in the manner previously described. The head end lift pressure in primary valve chamber 47' is now communicated with head end strut chamber 37 via valve seat 46', primary valve chamber 48', port 57', secondary valve chamber 73, and passage 76, while communication between secondary valve chamber 73 and primary valve chamber 51' is blocked due to primary spool 43' engaging seat 49'. Consequently, a stabilizing reaction force is applied by the strut rod 34 in the manner previously described.

Now, if the idler 19 is in a lowered position when high lift pressure exists, secondary valve 66 is in closed position due to the bell crank 81 being out of abutment with plunger 63, and the reaction force generating function of the strut is disabled. More particularly, with the secondary valve in closed position, communication between the primary valve chamber 47' and strut chamber 37 is blocked due to secondary spool 70 engaging valve seat 74 and thus preventing communication between secondary valve chamber 73 and passage 76. Thus, high head end lift cylinder pressure has no effect on the strut 31, and its stabilizing force function is rendered inoperable under the lowered idler condition.

It is to be noted, however, that assuming the loader bucket is being filled by raising the lift arms from the condition shown in FIG. 1 with the cutting edge against the stockpile 29 or a bank, the fulcrum or tipping point of the loader 11 is effectively moved from point A to point B when the idler is lowered. The lever arm acted upon by the bucket load is thus shortened and tipping stability is improved.

It should also be noted that the controlled damping action upon the track roller frame 17 is retained when the idler is in lowered condition. In this regard, the secondary valve 66 is in its closed position such that a throttling opening defined between secondary valve spool 70 and seat 77 communicates passage 76 with chamber 78. Such chamber communicates with primary valve chamber 51' via port 58', and the latter chamber is communicated with rod end chamber 38 of strut housing 32 through line 83. As a result, controlled damping of displaced fluid flow between strut chambers 37 and 38 is provided by the throttling opening in a manner similar to that previously described.

Although the invention has been hereinbefore described and illustrated in the accompanying drawings with respect to several preferred embodiments, it will be appreciated that numerous modifications and changes may be made therein without departing from the true spirit and scope of the invention, and thus it is not intended to limit the invention except by the terms of the appended claims.

What is claimed is:

1. In a loader having at least a front pair of track assemblies each including a track roller frame centrally pivotally mounted upon a front section of the loader frame with an idler forwardly displaced from the pivot, lift arms pivotally mounted on the front section of the loader frame and having an implement mounted thereon, and implement control means including at least one hydraulic lift cylinder pivotally secured to the front section of the loader frame having a head end and a rod end with a rod extending therefrom pivotally connected to the lift arms, the improvement comprising a hydraulic strut mounted between said front section of said loader frame and each front track roller frame at a point forwardly displaced from the pivot point of said frame, and means for sensing the load condition of said implement and hydraulically actuating each strut to generate a stabilizing reaction force between said front section frame and corresponding track roller frame in accordance with the sensed load condition.

2. The combination of claim 1, further defined by the load sensing and strut actuating means being arranged to actuate said strut only in response to the sensed load being in excess of a predetermined value, whereby said strut permits relatively free oscillation of its associated track roller frame when the sensed load is less than said predetermined value.

3. The combination of claim 1, further defined by level-sensing means operatively associated with each track roller frame and associated strut for disabling the generation of a stabilizing reaction force by said strut in response to the idler end of said roller frame being downwardly displaced from a level position.

4. The combination of claim 2, further defined by level-sensing means operatively associated with each track roller frame and associated strut for disabling the generation of a stabilizing reaction force by said strut in response to the idler end of said roller frame being downwardly displaced from a level position.

5. The combination of claim 1, further defined by each strut comprising a cylindrical housing having an extendable rod and piston mounted for reciprocal movement therein, the piston dividing the housing interior into head and rod end chambers, the head end of said housing being pivotally secured to said front section of said loader frame and said strut rod being pivotally end secured to said track roller frame, and the load sensing and strut actuating means including flow path means communicably connecting said head and rod end chambers of said strut in parallel with the head and rod end chambers of said lift cylinder.

6. The combination of claim 5, further defined by a primary valve interposed in the parallel connecting flow paths between said head and rod end chambers of said strut housing and lift cylinder respectively, said valve having an actuated position responsive to head end pressures in said lift cylinder greater than a predetermined value and an inactive position responsive to head end pressures in said lift cylinder less than said predetermined value, said valve in said actuated position permitting flow between said lift cylinder and strut housing, said valve in said inactive position establishing restricted fluid flow between said head and rod ends of said strut housing.

7. The combination of claim 6, further defined by a secondary level-sensing valve operatively associated with said primary valve having an open position determined by said roller frame being in a level position and a closed position determined by the idler end of said roller frame being downwardly displaced from level position, said secondary valve in said open position permitting flow between said primary valve and said head and rod end chambers of said strut housing, said secondary valve in said closed position preventing communication between said primary valve and said head end chamber of said strut housing to thereby disable the stabilizing reaction force function of said strut.

8. The combination of claim 6, further defined by said primary valve comprising a valve housing having a cylindrical bore therein, said bore having first and second annular valve seats formed therein respectively communicating a central chamber with first and second opposite end chambers, a spool mounted for reciprocation within said bore and having a reaction slug in communication with said first end chamber, means spring biasing said spool to an inactive position wherein said spool engages said first valve seat to block communication between said first end chamber and said central chamber and said spool is displaced from said second valve seat to establish restricted communication between said central chamber and said second end chamber, said spool being movable from said inactive position responsive to pressure in said first end chamber in excess of said predetermined value to an actuated position wherein said spool engages said second seat and is displaced from said first seat to thereby establish communication between said first end chamber and said central chamber while blocking communication between said central chamber and said second end chamber, means respectively communicably connecting the head and rod ends of said lift cylinder to said first and second end chambers of said valve, and means respectively communicably connecting said head and rod end chambers of said strut housing to said central and second end chambers of said valve.

9. The combination of claim 8, further defined by a secondary level-sensing valve means operatively associated with said primary valve, said secondary valve means having an open position determined by said roller frame being in a level position and a closed position determined by the idler end of said roller frame being downwardly displaced from level position, said secondary valve in said open position permitting flow between said central and second end chambers of said primary valve and said head and rod end chambers of said strut housing, said secondary valve in said closed position blocking communication between said central chamber of said primary valve and said head end chamber of said strut housing.

10. The combination of claim 7, further defined by said primary valve comprising a valve housing having a cylindrical bore therein, said bore having first and second annular valve seats formed therein respectively communicating first and second opposite end chambers with first and second non-communicating central chambers, a spool mounted for reciprocation within said bore and having a reaction slug in communication with said first end chamber, means spring biasing said spool to an inactive position wherein said spool engages said first valve seat to block communication between said first end chamber and first central chamber and said spool is displaced from said second valve seat to establish restricted communication between said second central chamber and said second end chamber, said spool being movable from said inactive position responsive to pressure in said first end chamber in excess of said predetermined value to an actuated position wherein said spool engages said second seat and is displaced from said first seat to thereby establish communication between said first end chamber and said first central chamber while blocking communication between said second central chamber and said second end chamber, and means communicably connecting said second end chamber to said rod end chamber of said strut housing and said first and second end chambers to said head and rod ends of said lift cylinder, said secondary level-sensing valve comprising a housing having a bore formed with first and second annular valve seats on longitudinally opposite sides of a passage communicating said secondary valve bore with said head end chamber of said strut housing, a passage communicating said second central chamber of said primary valve with said secondary valve bore at a point intermediate the first and second seats thereof, a secondary valve member including first and second longitudinally spaced spools mounted for reciprocation in said secondary valve bore and defining a first secondary valve chamber therebetween, means communicating said first secondary valve chamber with said first central chamber of said primary valve, means spring biasing said secondary valve member to said closed position wherein said second spool of said secondary valve member engages said first seat of said secondary valve bore to block communication between said first secondary valve chamber and said passage to said head end chamber of said strut housing and wherein said second spool is displaced from said second seat of said secondary valve bore to establish restricted communication between a second secondary valve chamber and said passage to said head end chamber of said strut housing, means communicating said second secondary valve chamber with said second end chamber of said primary valve and means for actuating said secondary valve member to said open position in response to said piston of said strut being disposed in centered position within said strut housing between said head and rod end chambers therein while permitting return of said secondary valve member to closed position in response to downward displacement of said piston from said centered position, said second spool of said secondary valve member in said open position being engaged with said second valve seat of said secondary valve to block communication between said second chamber thereof and said passage to said head end chamber of said strut while being displaced from said first valve seat of said secondary valve to establish communication between said first chamber of said secondary valve and said passages to said head end chamber of said strut and to said central chamber of said primary valve.

11. The combination of claim 10, further defined by the secondary valve member actuating means comprising a plunger projecting coaxially from said strut piston through said head end chamber of said strut housing into a casing disposed at the upper end thereof, and a bell crank pivotally mounted in said casing for clockwise rotation in response to abutment by said plunger, said plunger abutting said crank when said strut piston is in said centered position, said crank coupled to said secondary valve member to urge same to said open position responsive to clockwise rotation of said crank.

* * * * *